T. F. SHERIDAN.

STEM WINDING AND SETTING WATCH.

No. 11,100. Reissued Aug. 5, 1890.

Witnesses:
A. V. Cuehman
J. M. Pond.

Inventor:
Thomas F. Sheridan
by Henry Calver,
Atty.

THE NORRIS PETERS CO., PHOTO-LITHO., WASHINGTON, D. C.

T. F. SHERIDAN.

STEM WINDING AND SETTING WATCH.

No. 11,100. Reissued Aug. 5, 1890.

Witnesses:
A. V. Cushman
Julia M. Pond.

Inventor:
Thomas F. Sheridan,
by Henry Calver,
Atty.

THE NORRIS PETERS CO., PHOTO-LITHO., WASHINGTON, D. C.

UNITED STATES PATENT OFFICE.

THOMAS F. SHERIDAN, OF SPRINGFIELD, ILLINOIS.

STEM WINDING AND SETTING WATCH.

SPECIFICATION forming part of Reissued Letters Patent No. 11,100, dated August 5, 1890.

Original No. 376,015, dated January 3, 1888. Application for reissue filed June 13, 1890. Serial No. 355,905.

*To all whom it may concern:*

Be it known that I, THOMAS F. SHERIDAN, a citizen of the United States, residing at Springfield, in the county of Sangamon and State of Illinois, have invented certain new and useful Improvements in Stem Winding and Setting Watches; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of watches provided with stem-driven trains.

Heretofore in watches of this class stem-driven winding and setting trains have been designed which are either normally engaged with the dial-wheels or the winding-wheel. When the stem-driven train has been normally engaged with the winding-wheel, a positive connection was necessary between the stem-driven train and the stem-arbor to effect the setting engagement to the stem driven train and the dial-wheels. Consequently, as the stem-arbor was a part of the movement, the latter was not interchangeable in all styles of cases.

My invention has for its object to provide a watch-movement with a winding and hand-setting train of such construction that the movement may be used in any style of watch-case of either the lever or pendant-setting class. In my improved device the stem-driven train is normally in engagement with the winding-wheel, but is adapted to be placed in engagement with the dial-wheels by the action of a spring controlled by a setting-lever, or when placed in a watch-case provided with a longitudinally-movable stem-arbor said train can be permitted to assume either of the aforesaid engagements, according to the position in which the stem-arbor may be placed. My invention therefore renders the movement independent of any particular style of watch-case, while at the same time permitting it to be used in a watch-case of either the lever or pendant setting class.

Figure 1:
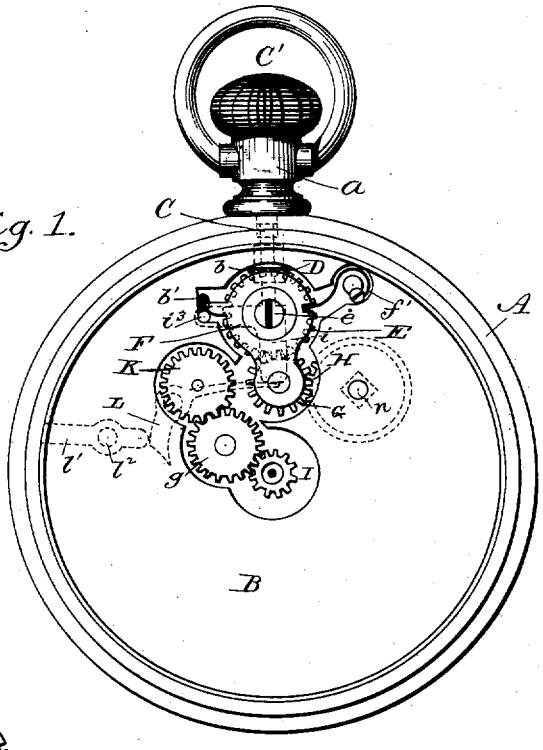
Figure 3:
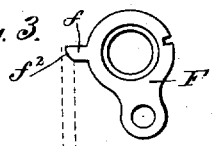
Figure 4:
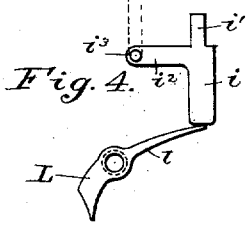
Figure 2:
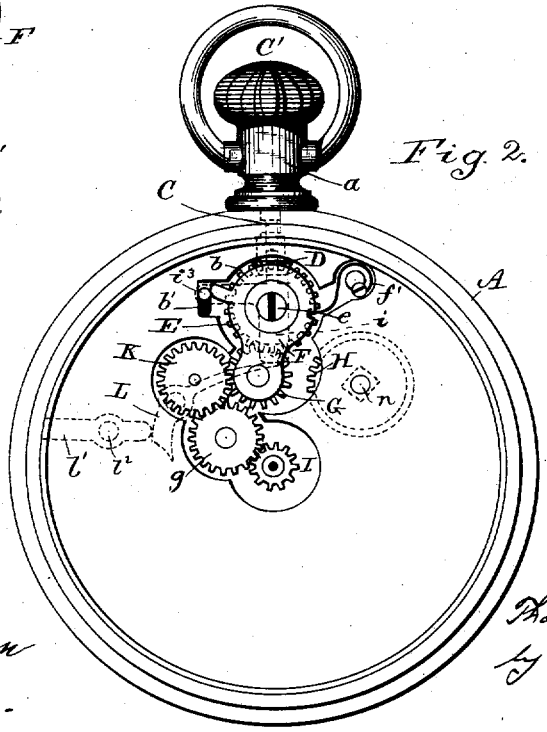
Figure 5:
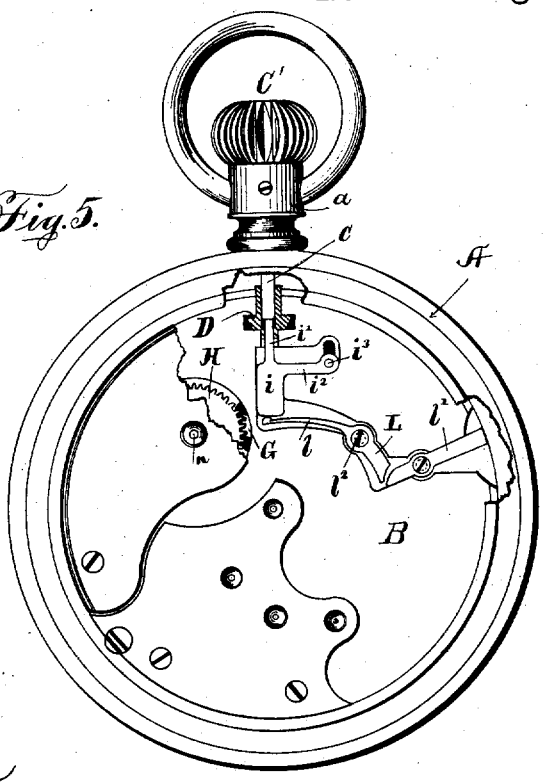
Figure 6:
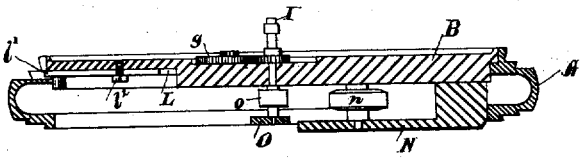

In the accompanying drawings, Figure 1 is a plan view of a watch-movement embodying my invention with the stem-driven train in engagement with the winding-wheel. Fig. 2 is a similar view of the same with the stem-driven train in engagement with the dial-wheels. Figs. 3 and 4 are detail views of portions of the winding and setting mechanism. Fig. 5 is a plan view of the side of a watch opposite to that shown in Figs. 1 and 2, and showing the setting-lever in position to allow a normal engagement of the stem-driven train with the winding-wheel. Fig. 6 is a transverse section of the movement and watch-case on the line 6 6 of Fig. 1.

In the drawings, A denotes the center band of a watch-case, which is provided with a pendant *a*.

B is the pillar or lower plate of a watch-movement, said plate being fitted or secured to the rim of said case in the usual manner.

Within the pendant *a* is a stem-arbor C, provided at its outer end with a corrugated cap or crown C′, the inner end of said stem-arbor having an axial engagement with the pinion D, which is journaled in a suitable bearing on the lower face of the plate B, and which has its toothed periphery extended through an opening *b* in said plate, where it engages the toothed wheel E, pivoted to said plate by the screw *e*, so that said wheel E can be rotated in either direction by rotating the stem-arbor.

On the upper end of the screw *e* is pivoted a yoke F, to the lower face of the free end of which is journaled a spur-wheel G, which is in gear with the wheel E, and which by the oscillation of said yoke upon its pivotal bearing may be moved into or out of engagement with the winding-wheel H, which is attached to the mainspring or barrel-arbor *n*, or into or out of engagement with the wheel K, which latter is constantly in gear with one of the dial-wheels.

To the plate B is secured a spring *f′*, which operates normally to hold said yoke in such position as to cause the spur-wheel G of the stem-driven train to engage the winding-wheel H, as shown in Fig. 1.

On the lower surface of the plate B is fitted a slide-bar *i*, the outer projecting end *i′* of which enters a recess in the pinion D. The said slide-bar is provided with a laterally-projecting arm $i^2$, carrying a pin $i^3$, which extends through an opening *b′* in the plate B, in position to engage the end or locking-angle $f^2$ of a lug $f$ on the yoke F.

In a suitable recess on the lower face of the plate B is a spring $l$, provided with a broad head or end L, the said spring being secured to said plate by the pivot-screw $l^2$. Also pivoted to the lower face of the plate B is a setting-lever $l'$, so arranged relatively to the end L of the spring $l$ as to engage the said end or head, as shown in Figs. 1 and 2, or to be disengaged therefrom, as shown in Fig. 5.

As hereinbefore stated, the gear-wheel G of the stem-driven train is normally held in engagement with the winding-wheel H by the spring $f'$ when the spring $l$ and the lever $l'$ are in the positions in Fig. 5. The spring $l$ is of greater strength than the spring $f'$, as will be evident from the relative sizes of said springs as represented in the drawings, and when the setting-lever $l'$ is turned into position to engage the end or head L of the spring $l$, and the said spring is thus placed under tension, its strength will be sufficient to overcome the stress of the spring $f'$, and thus, through the slide-bar $i$ and its pin $i^3$, acting on the lug $f$ of the yoke F, the said yoke will be oscillated to throw the spur-wheel G out of engagement with the winding-wheel H and into engagement with the wheel K of the dial-train. Thus it will be seen that the stem-driven train, which is normally held in engagement with the winding-wheel H by the spring $f'$, may be thrown out of engagement with the said winding-wheel and into engagement with the dial-train by moving the setting-lever $l'$ from the position shown in Fig. 5 to the position shown in Figs. 1 and 2; or, in other words, the stem-driven train may be disengaged from the winding-wheel H and thrown into engagement with the wheel K of the setting or dial train by causing the setting-lever $l'$ to engage the head L of the pivoted spring $l$, thus placing said spring under tension and causing it to overcome the stress of the spring $f'$. Thus, when the movement is out of its case during the process of timing and adjusting, or when the movement is applied to a case not having a longitudinally-movable stem-arbor, the stem-driven train may be thrown out of engagement with the winding-wheel and into engagement with the dial-wheels, or vice versa, by the movement of the said setting-lever $l'$. When, however, the movement is applied to a case having a longitudinally-movable stem-arbor, the setting-lever $l'$ will be caused to engage the end or head L and the spring $l$, as shown in Figs. 1 and 2, thus causing said spring to overcome the stress of the spring $f'$, as above described, when the stem-arbor is in its outer position, thereby throwing the spur-wheel G of the stem-setting train into engagement with the wheel K of the dial-train. To permit the said spur-wheel G to assume its normal position of engagement with the winding-wheel H, the longitudinally-movable stem-arbor is pressed inward, thus forcing inward the slide-bar $i$ against the stress of the spring $l'$, and thereby relieving the pivoted yoke F of the stress of the said spring, when the said yoke will be swung by the spring $f'$ acting thereon back to its normal position to throw the spur-wheel G out of engagement with the wheel K and into engagement with the winding-wheel. It will thus be apparent that by my invention a watch-movement having a stem-driven winding and setting train is adapted to be applied to pendant-setting or lever-setting cases, or, in other words, to cases having stem-arbors, which are or are not longitudinally movable.

I am aware that there are other devices which accomplish similar purposes—as, for example, a loose pin fitted in the winding-pinion to operate a vibratory lever, which is in turn connected with a swing locking-bar to operate the train-yoke; but this has its objection, as it requires several intermediary parts between the stem-arbor and the train-yoke. This objection is not found in my invention, which requires but one piece between the stem-arbor and the yoke.

Having described my invention, what I claim, and desire to secure by Letters Patent, is—

1. In a stem winding and setting watch, the combination of the stem-driven train, the yoke F, having a projecting lug formed with a locking-angle or end $f^2$, the slide-bar $i$, having the projection $i'$, to enter a recess in the pinion D, and a lateral arm $i^2$, carrying the pin $i^3$, the spring $l$, pivoted to the pillar-plate B, and having the head portion L, and the setting-lever $l'$, pivoted to the said plate and adapted to engage the head of the said spring, substantially as specified.

2. The combination, with a stem-driven train and its pivoted yoke F, of the slide-bar $i$, substantially as described, the stem-arbor, and the spring $l$, whereby said yoke may be moved to connect or disconnect said train with reference to the winding-wheel, substantially as specified.

3. The combination, with a stem-driven train, which is provided with a pivoted yoke F, having a projecting lug $f$, formed with a locking-angle or end $f^2$, of the slide-bar $i$, having an arm $i^2$, and a projection or pin $i^3$, extending through the pillar-plate to engage the yoke-lug $f$, substantially as specified.

4. In combination with a pivoted yoke F, the slide-bar $i$, substantially as described, a spring $l$, and setting-lever $l'$, of a stem-arbor, the stem-driven train, the winding-wheel, and the dial-wheels, substantially as and for the purpose set forth.

In testimony whereof I affix my signature in presence of two witnesses.

THOS. F. SHERIDAN.

Witnesses:

FRED I. GETTY,

GEORGE A. BATES.